United States Patent [19]

Nishitani

[11] Patent Number: 4,862,173
[45] Date of Patent: Aug. 29, 1989

[54] METHOD AND CIRCUIT FOR CARRYING OUT FORWARD AND INVERSE QUANTIZATION BY VARYING A REFERENCE STEP SIZE

[75] Inventor: Takao Nishitani, Tokyo, Japan

[73] Assignee: Nippon Electric Co., Ltd., Tokyo, Japan

[21] Appl. No.: 858,865

[22] Filed: May 1, 1986

Related U.S. Application Data

[63] Continuation of Ser. No. 399,590, Jul. 19, 1982, abandoned.

[30] Foreign Application Priority Data

Jul. 17, 1981 [JP] Japan ................................. 56-111977
May 18, 1982 [JP] Japan ................................. 57-83490

[51] Int. Cl.⁴ .............................................. H03M 7/36
[52] U.S. Cl. ...................................... 341/200; 341/51; 341/144; 358/135; 375/26
[58] Field of Search ................... 340/347 AD, 347 M; 332/110; 375/25–28; 358/135, 136; 341/50, 51, 56, 144, 155, 143, 200

[56] References Cited

U.S. PATENT DOCUMENTS

| | | | |
|---|---|---|---|
| 3,824,590 | 7/1974 | Limb ................................. | 358/135 X |
| 3,878,465 | 4/1975 | Stephenne et al. ................... | 375/32 |
| 3,882,426 | 5/1975 | Hoeschele, Jr. ..................... | 332/11 D |
| 3,922,619 | 11/1975 | Thompson ......................... | 375/28 X |
| 4,039,948 | 8/1977 | Boxall ............................... | 370/77 X |
| 4,144,543 | 3/1979 | Koga ................................. | 358/136 |
| 4,206,447 | 6/1980 | Ching et al. ................. | 340/347 DD |
| 4,532,494 | 7/1985 | Sasaki et al. ....................... | 375/28 X |

Primary Examiner—William M. Shoop, Jr.
Assistant Examiner—Brian Young
Attorney, Agent, or Firm—Sughrue, Mion, Zinn, Macpeak & Seas

[57] ABSTRACT

A succession of input signals supplied to a quantizer is processed at sampling instants into a succession of quantized codes by step sizes with a current one of the quantized codes produced at each sampling instant with reference to a current step size adaptively decided not only by a next previous quantized code and a next previous step size but also by a reference size which is determined in accordance with an average level derived from a plurality of prior quantized codes produced until production of the next previous quantized code. A decoder decodes the quantized code succession into a reproduction of the quantizer input signal succession with each quantized code decoded with reference to a similarly adaptively decided step size. It is possible that the reference step size to be determined in a digital fashion as one of a few predetermined sizes or in an analog manner to be variable between two predetermined reference sizes. Each quantizer input signal may be given either as an analog signal sample or as a digital signal represented by a plurality of bits which are greater in number than the bits of each quantized code produced by the quantizer.

20 Claims, 5 Drawing Sheets

METHOD AND CIRCUIT FOR CARRYING OUT FORWARD AND INVERSE QUANTIZATION BY VARYING A REFERENCE STEP SIZE

This is a continuation of application Ser. No. 399,590, filed July 19, 1982.

BACKGROUND OF THE INVENTION

This invention relates to a method of adaptive forward and/or inverse quantization and an electric circuit for use in carrying out the method.

In general, such a method is used to quantize each of sampled values derived from an input signal into a quantized code of a predetermined number of bits and to adaptively vary a quantization step or step size in accordance with a level which the sampled value has. With the adaptive method, it is possible to reduce the number of bits necessary for quantization of each sampled value, as compared with a nonadaptive method and to precisely reproduce or inversely quantize the quantized code of the reduced number of bits.

As will later be described with reference to one of about ten figures of the accompanying drawing, a conventional adaptive quantization method is disclosed in an article contributed by N. S. Jayant to The Bell System Technical Journal, Vol. 52, No. 7 (September 1973), pages 1119-1144, under the title of "Adaptive Quantization with a One-Word Memory." According to the Jayant method, the sampled value is adaptively quantized on a transmitting side by linearly varying the step sizes in accordance with an increase of a level of the sampled value. The sampled value may take a negative, a zero, or a positive value each of which may be represented by a preselected number of bits. It is possible with the Jayant method to precisely and faithfully carry out forward and inverse quantization of the sampled value even when the input signal widely varies. However, this method is disadvantageous in that the quantized code can not be produced on a receiving side if the step sizes are not initially coincident with each other on the transmitting and the receiving sides. In addition, the method is susceptible to a transmission error which might occur in a transmission line between the transmitting and the receiving sides.

Alternatively, another conventional method is disclosed in a correspondence by Goodman et al to IEEE Transactions on Communications, November 1975, pages 1362-1365 under the title of "A Robust Adaptive Quantizer." With the Goodman et al quantizer, the step sizes are nonlinearly varied in order to alleviate an influence of noncoincidence between the initial step sizes of the transmitting and the receiving sides and to reduce the transmission error. However, a reduction of quantization precision is inevitable when the input signal has a high or a low level as compared with an average level of the input signal.

SUMMARY OF THE INVENTION

It is an object of this invention to provide a method of forward and/or inverse quantization, wherein coincidence of initial step sizes is not always required on a transmitting and a receiving side on reproduction of a quantized code on the receiving side.

It is another object of this invention to provide a method of the type described, wherein an influence of a transmission error will be alleviated with time.

It is yet another object of this invention to provide a method of the type described, wherein quantization precision is not reduced even for the input signal of a high and a low level.

It is a further object of this invention to provide a quantizing circuit for use in the above-mentioned method, wherein quantization precision is rarely reduced even for the input signal of a high or a low level.

It is a still further object of this invention to provide an inverse quantization circuit which is for use in combination with the quantization circuit mentioned above and which can alleviate noncoincidence of step sizes on the transmitting and the receiving sides.

It is a yet further object of this invention to provide a system for carrying out forward and inverse quantization, which contributes to a band restriction of transmission data due to a reduction of the number of the transmission data.

A method to which this invention is applicable is for carrying out a predetermined one of forward and inverse quantizing operations on a succession of input signals to produce a succession of output signals in timed relation to the respective input signals. The input and the output signals are, when the predetermined one operation is the inverse and the forward quantizing operations, respectively, a succession of quantized codes. The forward quantizing operation is for disposing of the input signals into the respective quantized codes. The inverse quantizing operation is for disposing of the quantized codes into the respective output signals. The quantized codes are disposed of at successive instants spaced by a predetermined interval of time, respectively, in relation to step sizes which are decided at the respective instants with a current one of the step sizes decided for disposition of a current one of the quantized codes at a current one of the instants with reference to a previous step size and a previous quantized code. The previous step size is one of the step sizes that is decided at a previous instant. The previous instant is one of the instants that is the predetermined interval prior to the current instant. The previous quantized code is one of the quantized codes that is disposed of at the previous instant. According to this invention, the predetermined one operation comprises the steps of monitoring the quantized code succession to provide a level signal representative of, at the current instant, a level dependent on a plurality of those ones of the quantized codes which precede the current quantized code and include the previous quantized code, defining a reference size in accordance with the level, and deciding the step size at a subsequent one of the instants that is the predetermined interval after the current instant, with reference to the current quantized code and the current step size and additionally to the reference size.

DESCRIPTION OF THE PREFERRED EMBODIMENTS

(1) Prior Art (Part I)

Figure 1:
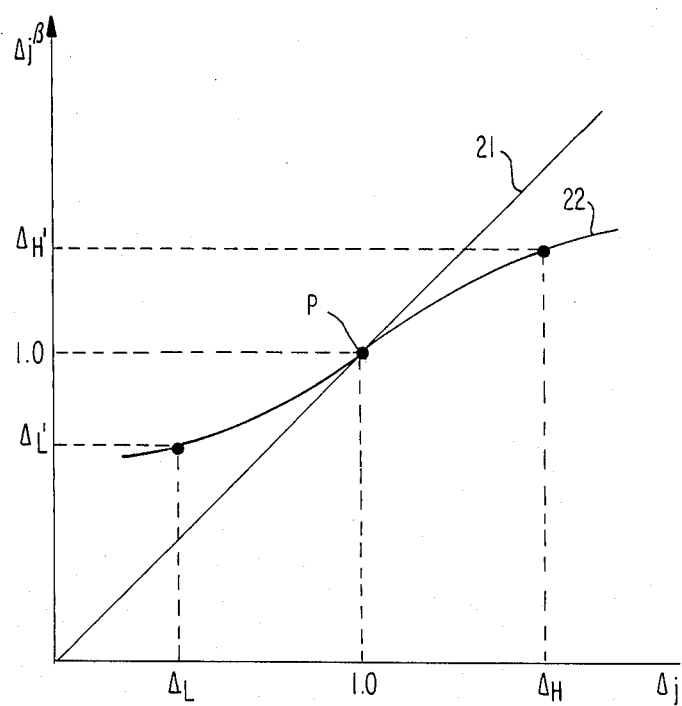
FIG. 1 shows a graph for describing two of conventional adaptive quantization methods.

At first, the principles of conventional adaptive quantization described in detail in the above-referenced Jayant article will be summarized. It is assumed that, at a current sampling instant j, an input signal $x_j$ is given by:

$$n_j \cdot \Delta_j \leq x_j < (n_j + 1) \cdot \Delta_j, \tag{1}$$

where $\Delta_j$ represents an adaptive quantizing step, namely, a step size at the current sampling instant j and $n_j$, a value or a quantized code selected from a group of $(0, +1, +2, \ldots, +(2^{m-1}-1),$ and $-2^{m-1})$, where m is representative of the number of bits predetermined for the quantization.

If the formula (1) holds as regards the input signal $x_j$, the adaptive quantization results in an output signal given by the value of the selected quantized code $n_j$. Depending on the selected value or the selected quantized code $n_j$ at the current sampling instant j, the step size $\Delta_j$ is varied at the next following sampling instant (j+1) to a succeeding or subsequent step size $\Delta_{j+1}$ given by:

$$\Delta_{j+1} = \Delta_j \cdot M(n_j), \tag{2}$$

where $M(n_j)$ represents a multiplier uniquely determined by the selected code value $n_j$. The Jayant quantization is specified by an algorithm represented by the formula (2). The sampling instants are spaced from one another by a predetermined sampling interval. Table 1 exemplifies a variety of such multipliers which are for use in encoding an audio signal sampled by sampling pulses of a sampling frequency 8 kHz into four bits (m=4).

TABLE 1

| n | M(n) |
|---|------|
| 0 | 0.8 |
| ±1 | 0.8 |
| ±2 | 0.8 |
| ±4 | 1.2 |
| ±5 | 1.6 |
| ±6 | 2.0 |
| ±7 | 2.4 |
| −8 | 2.4 |

Thus, the succeeding step size $\Delta_{j+1}$ is adaptively varied with reference to the selected code value $n_j$ for the current step size $\Delta_j$. Based on the principles, it is possible to make a quantizer have a wider dynamic range of quantization. This is because the quantizer is vulnerable by expanding and compressing a step size even when an overload noise and a continuous succession of zero appear in an output signal. Moreover, quantization defined by the formula (1) can be carried out at a high precision if the succeeeding step size given by the formula (2) favorably tracks the input signal.

Coupled to a transmitting side comprising the quantizer of the type described, a receiving side can reproduce a transmitted signal into a signal $x_j$ by dequantizing or inversely quantizing the transmitted signal in accordance with the following formula.

$$x_j = n_j \cdot \Delta_j + 0.5 \Delta_j. \tag{3}$$

In order to make the reproduced signal $x_j$ equal to the input signal $x_j$, the step sizes $\Delta_j$ should be same on the transmitting and the receiving sides. For realization of the same step sizes $\Delta_j$ in the transmitting and the receiving sides, coincidence of initial step sizes $\Delta_0$ is required on the transmitting and the receiving sides at the beginning of transmission. Moreover, occurrence of no transmission error should be assumed on a transmission line as regards the quantized codes. In other words, a succession of the quantized codes represented by $n_j$ should be correctly transmitted at all times. Under these circumstances, the multipliers $M(n_j)$ become coincident with each other in the transmitter and the receiver to realize the equal step sizes $\Delta_j$.

Taking the above into consideration, the conventional adaptive quantization is effective in that an input signal can precisely be transmitted by a reduced number of bits. However, this quantization is disadvantageous in that the step sizes must initially be identical with each other in both of the transmitter and a receiver.

In addition, the transmission errors are actually inevitable on the transmission line due to thermal noise and characteristics of the transmission line. As a result, non-coincidence of the step sizes frequently occurs between the transmitting and the receiving sides.

(2) Prior Art (Part II)

According to the above cited Goodman et al correspondence, it is possible to remove the above-mentioned defects.

Briefly, the proposal substitutes the following formula (4) for the formula (2).

$$\Delta_{j+1} = \Delta_j^\beta \cdot M'(n_j), \tag{4}$$

where $\beta$ represents a preselected number near to and less than one and $M'(n_j)$, a multiplier uniquely determined by the selected value of the quantized code $n_j$. For simplicity of notation, $M'(n_j)$ will be expressed again by $M(n_j)$.

Formula (4) defines an algorithm specifying the Goodman et al quantization and is rewritten by the use of an initial step-size $\Delta_0$ into:

$$\Delta_{j+1} M(n_j) \cdot M(n_{j-1})^\beta \cdot M(n_{j-2})^{\beta^2} \ldots \\ M(n_1)^{\beta^{j-1}} \cdot M(n_0)^{\beta^j} \cdot \Delta_0^{\beta^j}. \tag{5}$$

Since the preselected number $\beta$ is less than one, $\beta^k$ ($0 \leq k \leq j$) gradually converges to zero with an increase of k. Herein, the step-sizes of the transmitting and the receiving sides will be expressed by $T\Delta$ and $R\Delta$ to clarify the distinctions between them. Inasmuch as the quantized code succession per se has to be coincident on the transmitting and the receiving sides even when the initial step sizes $T\Delta_0$ and $R\Delta_0$ are different, a ratio of the step-size on the transmitting side to that on the receiving sides is given at a subsequent sample point (j+1) by:

$$T\Delta_{j'+1}/R\Delta_{j'+1} = (T\Delta_0/R\Delta_0)^{\beta^j}. \qquad (6)$$

From the formula (6), it can be seen that the ratio converges to one with an increase in the serial number of the sampling instant j. In other words, the step-size $R\Delta$ of the receiving side approaches the step size $T\Delta$ of the transmitting side as the serial number j. Thus, the Goodman et al correspondence does not always require coincidence of the initial step sizes in the transmitting and the receiving sides.

Furthermore, the transmission error is alleviated also according to the Goodman et al correspondence as follows. Let the transmission error occur at a specific one of the sampling instants j' on a transmission line. At this time, noncoincidence of the step sizes takes place at the next following sampling instant (j'+1) in the transmitting and the receiving side because of a difference between the multipliers $M(n_{j'})$ used in the transmitting and the receiving sides. With the Goodman et al correspondence, the specific sampling instant j' may be defined again as a new initial sampling instant of which initial step sizes are different from each other in the transmitting and the receiving sides. This is similar to the case mentioned above in conjunction with noncoincidence of the initial step-sizes. Under the circumstances, it is readily understood that the step-size of the receiving side gradually approximates that of the transmitting side with lapse of time even on occurrence of a transmission error.

(3) Comparison

Let the input signal be an audio signal having a wide dynamic range over 60 dB and the audio signal be quantized in accordance with the algorithm defined by the formula (4). As mentioned before, the Goodman et al algorithm strongly withstands the transmission error. As regards the quantization precision, the Goodman et al correspondence has no problem when the level of the input signal is near to an average level of the audio signal. However, a reduction of the quantization precision is inevitable when the input signal has an extremely high or low level as compared with the average level.

The above-mentioned reason will be described in detail hereunder in comparison with the algorithms used in the Jayant article and the Goodman et al correspondence. The formula (2) is different from the formula (4) in that the power of the preselected number $\beta$ is included in the formula (4). Thus, the differences between them can be specified by inspecting a relationship between adaptive step sizes $\Delta_j$ and $\Delta_j^\beta$.

Referring to FIG. 1, wherein the abscissa and the ordinate represent the adaptive step sizes $\Delta_j$ and $\Delta_j^\beta$, respectively, the relationship between both step sizes $\Delta_j$ and $\Delta_j^\beta$ is shown by a straight line 21 when the preselected number $\beta$ is equal to one. When the preselected number $\beta$ becomes less than one, the relationship is changed from the straight line 21 to a curve 22. The straight line 21 intersects the curve 22 at a specific point P of the coordinates (1.0, 1.0).

In FIG. 1, the adaptive step sizes $\Delta_j$ and $\Delta_j^\beta$ along the abscissa and the ordinate may be regarded as those forward and posterior to quantization based on the algorithms according to Jayant and Goodman et al. In other words, step sizes of the input and the output signals are specified by the step size $\Delta_j$ and $\Delta_j^\beta$, respectively. Therefore, the step sizes $\Delta_j$ and $\Delta_j^\beta$ will be referred to as an input and an output step size before and after the quantization, respectively.

As shown in FIG. 1, the output step size $\Delta_j^\beta$ is greater than the input step size $\Delta_j$ on the lefthand side of the specific point P and is smaller than the input step size $\Delta_j$ on the righthand side thereof. This is because the preselected number $\beta$ is less than one. At any rate, the specific point P defined by an intersection between the straight line 21 and the curve 22 provides a reference point for quantization. Thus, it may be said that the intersection gives a reference level $\Delta_j$ along the abscissa. Therefore, the abscissa (1.0) of the intersection will be called a reference step size. When the input signal is quantized at the reference step size, the input signal may be regarded as having the average level as mentioned before.

Now, let the input signal have a stationary level that is higher than the average level. At this time, the input step size is usually present in the vicinity of a high input step size $\Delta_H$ higher than the reference step size (1.0). According to the Goodman et al correspondence, quantization is carried out along the curve 22. As a result, the output step size $\Delta_j^\beta$ takes a high output step size $\Delta_H'$ lower than that obtained from the straight line 21 with respect to the high input step size $\Delta_H$. This means that the high output step size $\Delta_H'$ according to the formula (4) is compressed in comparison with that according to the formula (2). Such compression results from calculation of $\Delta_H^\beta$. A difference between both of the high output step sizes, namely, a degree of compression undesiredly increases as the input step size $\Delta_j$ is displaced away from the reference step size (1.0). In consequence of the compression, the output step size $\Delta_j^\beta$ is reduced relative to a true step size necessary for quantization of a high input level. Therefore, overload noise frequently occurs with the Goodman et al quantization and the quantization precision is inevitably deteriorated, when the input signal has the high stationary level.

On the other hand, let the input signal have a stationary low level that is lower than the average level. The stationary low level of the input signal is to be mainly quantized in the vicinity of a low input step size $\Delta_L$ lower than the reference step size (1.0). According to the formula (4), the output step size $\Delta_j^\beta$ takes a low output step size $\Delta_L'$ higher than that defined by the straight line 21 with respect to the low input step size $\Delta_L$. The output low step size $\Delta_L'$ is expanded in connection with the low stationary level of the input signal, as compared with that necessary for quantization of the low stationary level. Therefore, the low stationary level is coarsely quantized according to Goodman et al. This means that necessary bits are unexpectedly lost on quantization of the input signal. Thus, a reduction is inevitable in adaptability of the output step sizes and in quantization precision when the input signal has the low stationary level.

If the preselected value $\beta$ becomes nearer to one, the quantization is improved more and more in either of the high and the low stationary levels. As described in conjunction with FIG. 1, noncoincidence between the step sizes are not removed in the transmitting and the receiving sides for a long time when the transmission error occurs in the transmission line.

(4) General Principle of the Invention

Figure 2:
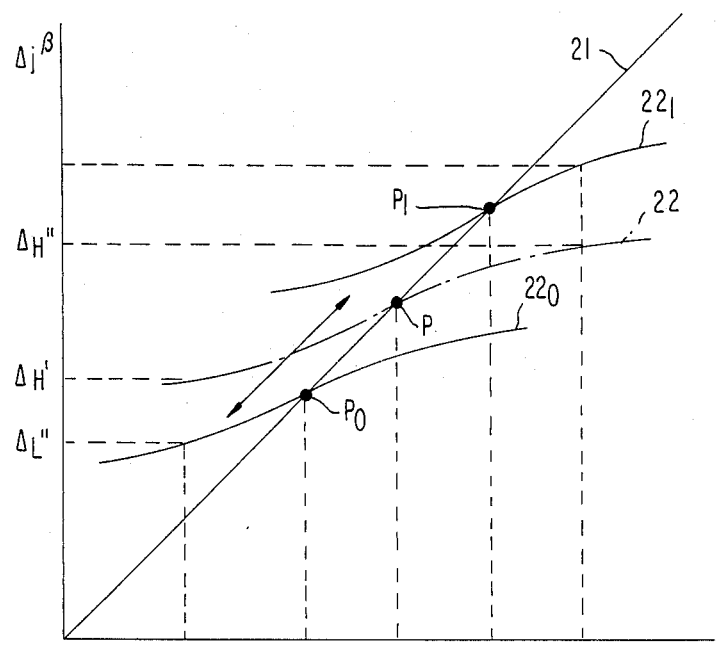
FIG. 2 schematically shows a similar graph for describing principles of this invention.

Referring to FIG. 2, the general principle of this invention resides in varying the curve 22 within a predetermined range, an exemplified by curves $22_0$ and $22_1$.

As to the curve 22, the intersection or specific point P gives the reference step size to the input step size $\Delta_j$ along the abscissa, as is the case with the curve 22 illustrated in FIG. 1. Likewise, the curves $22_0$ and $22_1$ intersect the straight line 21 at intersections $P_0$ and $P_1$, respectively. As regards the curves $22_0$ and $22_1$, both intersections $P_0$ and $P_1$ give reference sizes $\Delta_{S0}$ and $\Delta_{S1}$ to the input step size $\Delta_j$ along the abscissa thereof, respectively.

It is to be mentioned here that the curves $22_0$ and $22_1$ are equivalent to those displaced in parallel from the curve 22 and variations of the curve 22 are accomplished by changing one of the reference step sizes to the other, as will later be described.

Briefly, such variations of the reference step size is effected by monitoring a succession of quantized signals at a rate considerably slower than the sampling period, as will be detailed hereinafter. The reference step size may be changed over either in a discrete manner, such as from the reference step size $\Delta_{S0}$ to the other $\Delta_{S1}$ or a continuous manner, as modifying the reference step size (1.0). Anyway, the rate of the change or variation should be considerably slower than the sampling period, as will become clear as the description proceeds.

For generality of description, the reference step sizes will merely be represented by $\Delta_S$. Formula (4) is rewritten into:

$$\Delta_{j+1} = (\Delta_j/\Delta_S)^\beta \cdot \Delta_S \cdot M(n_j). \qquad (7)$$

It is clear that the formula (7) is identical with the formula (4) if $\Delta_S = 1.0$. If $\Delta_S \ne 0$, the curve 22 is shifted towards the curve $22_0$ or $22_1$ to provide along the abscissa each reference step size represented by $\Delta_S$. Furthermore, it is readily understood that the formula (6) holds also when quantization is carried out by the use of the formula (7) and that alleviation is possible of noncoincidence of the step-sizes in the transmitting and the receiving sides.

(5) First Aspect of the Invention

According to a first aspect of this invention, the reference step sizes illustrated with reference to FIG. 2 are switched in a digital manner from one of the reference step sizes to the other. Herein, the reference sizes $\Delta_{S0}$ and $\Delta_{S1}$ will be called a first and a second reference step size, respectively, and switching is carried out between the first and the second reference step sizes $\Delta_{S0}$ and $\Delta_{S1}$. As shown in FIG. 2, the first reference step size $\Delta_{S0}$ is smaller or narrower than the second reference step size $\Delta_{S1}$. Either one of the first and the second reference step sizes $\Delta_{S0}$ and $\Delta_{S1}$ is selected after the quantized code is calculated by the use of the first and the second reference step sizes $\Delta_{S0}$ and $\Delta_{S1}$. Specifically, selection is made of either one of the first and the second reference step sizes $\Delta_{S0}$ and $\Delta_{S1}$ from the results of calculations.

In FIG. 2, the curves $22_0$ and $22_1$ specify the relationships between the input step size $\Delta_j$ and the output step size $\Delta_j^\beta$ appearing when the first and the second reference step sizes $\Delta_{S0}$ and $\Delta_{S1}$ are selected, respectively. The curve 22 which is actually unused is also illustrated in FIG. 2 by a dot-and-dash line merely for the purpose of comparison. The curves $22_0$ and $22_1$ are displaced substantially parallel from the curve 22, with the curves $22_0$ and $22_1$ intersecting the straight line 21 at the first and the second points $P_0$ and $P_1$.

Anyway, either one of the curves $22_0$ and $22_1$ is used to quantize the input signal and is changed over or switched to the other by monitoring electric energy or power of the input signal during a short time longer than the sample period. Such energy can be calculated by the use of a plurality of quantized codes. Thus, the succeeding step-size at the next following sampling instant $(j+1)$ is determined by the use of the curves $22_0$ and $22_1$ when the input signal has a high and a low level, respectively.

Let the input signal stationarily have a high level. In this case, the input step-size $\Delta_j$ is near to the higher step-size $\Delta_H$ at a high probability, as mentioned in conjunction with FIG. 1. The output step-size $\Delta_j^\beta$ which is represented along the ordinate becomes equal to output step-sizes $\Delta_H'$ and $\Delta_H''$ in the conventional method and this invention, respectively, as illustrated in FIG. 2.

It is obvious that the output step-size $\Delta_H''$ is nearer than the output step-size $\Delta_H'$ to the straight line 21. Accordingly, it is possible for this invention to avoid any overload state on quantization even when the input signal is high.

On the other hand, when the input signal is low, the output step-size $\Delta_j^\beta$ is determined by the curves 22 and 24 in the conventional method and this invention, respectively, and is given by output step-sizes $\Delta_L'$ and $\Delta_L''$, respectively. Inasmuch as the output step-size $\Delta_L''$ is nearer to the straight line 21 than the output step-size $\Delta_L'$, this invention enables the encoding precision to be considerably improved even when the input signal has a low level.

With this invention, adaptability of the output step-size is reduced in the vicinity of the input step size, namely, the reference step-size (1.0) as compared with the conventional method. A difference between the straight line 21 and the curve 22 is considerably small at the input size (1.0) as compared with a difference between the straight line 21 and the curve 22 which occurs at the higher input step size $\Delta_H$. This means that this invention is more effective than the conventional method when the input signal, such as the audio signal, is widely varied at each person, as is the case with the audio signal intensity fluctuated with time.

(6) Evaluation of the Transmission Error

The above-mentioned method according to the first aspect of this invention strongly withstands a transmission error occurring on a transmission line. This will be verified hereinunder. Let the curve $22_1$ be used to decide the output step sizes and the transmission error take place at the current sampling instant j. If the curve $22_1$ is succeedingly used to determine the following output step sizes, one of the following output step sizes $\Delta_{j+k}$ is given at one of the following sampling instants $(j+k)$ by:

$$\Delta_{j+k} = M(n_{j+k-1}) \cdot M(n_{j+k-2})^\beta \ldots \qquad (8)$$
$$M(n_{j+1})^{\beta k-2} \cdot M(n_j)^{\beta k-1} \cdot (\Delta_j/\Delta_{S1})^{\beta k} \cdot \Delta_{S1}.$$

It is apparent that the formula (8) is obtained by modifying the formula (5). As readily understood from the formula (8), the factor $(\Delta_j/\Delta_{S1})^{\beta k}$ converges to one with a lapse of time. When a relationship similar to the formula (6) is calculated in connection with the formula (8), the step sizes gradually become equal to each other on the transmitting and the receiving sides.

Let a transmission error result in noncoincidence of instantaneous step sizes on both of the transmitting and the receiving sides and give rise to fluctuation of the levels of the input signal. The curve $22_1$ should be changed over to the curve $22_0$ along which the output step sizes are determined after occurrence of such a transmission error. In this case, noncoincidence takes place in the succeeding step sizes of the transmitting and the receiving sides at the next following sampling instant posterior to occurrence of the transmission error. The noncoincidence between both step sizes can be written into:

$$[(\Delta_j/\Delta_{SO})^\beta \cdot \Delta_{S0} \cdot M(n_j)]/[(\Delta_j/\Delta_{S1})^\beta \cdot \Delta_{S1} \cdot M(n_j)] \quad (9)$$

$$= (\Delta_{S1}/\Delta_{S0})^\beta \cdot (\Delta_{S0}/\Delta_{S1})$$

$$= (\delta\delta_{S0}/\Delta_{S1})^{1-\beta}.$$

Since the preselected value $\beta$ is approximately equal to one as mentioned before, the formula (9) takes a value nearly equal to one. Thus, any influence resulting from the above-mentioned noncoincidence of the reference step sizes is substantially neligible. A series influence rarely appears even when the step sizes are determined by the use of different curves on the transmitting and the receiving sides, in consequence of calculation of the levels of the input signals.

After occurrence of the transmission error, a difference between the step sizes on the transmitting and the receiving sides is gradually reduced with time in accordance with the formula (8).

When the different curves are used in the transmitting and the receiving sides, the steps sizes are not coincident with each other until coincidence of the curves on the transmitting and the receiving sides. In order to make the curves coincide on both of the transmitting and the receiving sides, the input signals are monitored on both sides to calculate the levels or energy thereof and to modify or change the curves with reference to the calculated levels or energy on both sides. Inasmuch as it takes a short time to modify and make the curves coincide with each other, noncoincidence appears between the step sizes of the transmitting and the receiving sides for a while. However, such noncoincidence may be substantially negligible as described above. Thus, a serious deterioration is avoidable both in the forward quantization and the inverse quantization.

(2) Second Aspect of the Invention

According to a second aspect of this invention, the reference step size $\Delta_S$ is continuously varied at a predetermined rate within a prescribed range between step sizes $\Delta_{S0}$ and $\Delta_{S1}$ as shown in FIG. 2. The predetermined rate is determined by a rate control signal having a frequency less than 100 Hz and is, therefore, varied slower than the sampling period. It is possible to derive such a rate control signal from a succession of quantized signals by allowing the quantized signals to pass through a low pass filter. The rate control signal is dependent on amplitudes or electric power (energy) of the quantized signals appearing until the current sampling instant.

When the reference step size $\Delta_S$ is varied in the abovementioned manner, the curves 22 is slowly shifted between the curves $22_0$ and $22_1$, both inclusive.

Let the input signal stationarily have a high level and be quantized according to the second aspect of this invention. In this case, the reference step size $\Delta_{S1}$ is used in the quantization along the curve $22_1$. It is assumed that the reference step size $\Delta_{S1}$ of the transmitting side is equal to that of the receiving side and that an input step size is equal to $\Delta_H$ at the current sampling instant j.

The quantization precision is improved according to the second aspect of this invention, as is the case with the first aspect of this invention. More particularly, with the Goodman et al quantizer, a first output step size becomes $\Delta_{H'}$ when the input signal is to be quantized at the input step size of $\Delta_H$, as is clear from the curve 22. With this invention, quantization is carried out in accordance with the curve $22_1$. As a result, a second output step size of $\Delta_{H''}$ is produced in connection with the input step size $\Delta_H$. The second output step size $\Delta_{H''}$ is nearer to the straight line 21 than the first output step size $\Delta_{H'}$. This means that deterioration of quantization is reduced in this invention when the input signal has the high level.

If the input signal stationarily has a low level corresponding to an input step size of $\Delta_L$, an output step size $\Delta_{L'}$ is given according to the Goodman et al correspondence while an output step size $\Delta_{L''}$ is given in this invention by the use of the curve $22_0$. The latter output size $\Delta_{L''}$ is nearer to the former and, therefore, precise quantization is accomplished with this invention as compared with the conventional method proposed by Goodman et al.

(8) Evaluation of a Transmission Error

A transmission error is alleviated in a method according to the second aspect of this invention, as will be described hereunder. Let the reference step size be represented by $\Delta_{Sj}$. During recurrence of the formula (7), the step size $\Delta_{j+1}$ at the sampling instant (j+1) is given by:

$$\begin{aligned}\Delta_{j+1} &= \Delta_j^\beta \cdot M(n_j) \cdot \Delta_j^{(1-\beta)}, \quad (10)\\ &= M(n_j) \cdot M(n_{j-1})^\beta \cdot M(n_{j-2})^{\beta 2} \cdots \\ &\quad M^{\beta j-1}(n_1) \cdot M(n_0)^{\beta j} \times \\ &\quad \Delta_{Sj}^{(1-\beta)} \cdot \Delta_{S(j-1)}^{(1-\beta)\beta} \cdot \Delta_{S(j-2)}^{(1-\beta)\beta 2} \cdots \Delta_{S0}^{(1-\beta)\beta j} \cdot \Delta_0^{\beta j}.\end{aligned}$$

During transmission of the input signal, such as an audio signal, a quiescent duration, namely, a duration of no input signal is inevitably present. After the quiescent duration is finished, the reference step size may be estimated at the beginning of the input signal at the step size $\Delta_{S0}$ which gives a minimum one of all the reference step sizes $\Delta_{Sj} \sim \Delta_{S0}$. In addition, it may be assumed at the beginning of the input signal that the reference step size of the transmitting side extremely near to that of the receiving side even when the reference step sizes are different on both sides.

Herein, the reference step sizes of the transmitting and the receiving sides are indicated to $T\Delta S$ and $R\Delta S$, respectively, for the purpose of distinction while the step sizes of them, $T\Delta$ and $R\Delta$, respectively. A suffix is attached to each of the reference step sizes and the step sizes to specify the current and previous sampling instants j, j−1, ..., 0. Taking the above into consideration, the ratio of the step sizes at the sampling instant (j+1) is represented by:

$$R\Delta_{j+1}/T\Delta_{j+1} = (R\Delta_j/T\Delta_j)^{(1-\beta)} \cdot (R\Delta_{j-1}/T\Delta_{j-1})^{(1-\beta)\beta} \cdots \quad (11)$$

$$(R\Delta_1/T\Delta_1)^{(1-\beta)\beta j-1} \cdot (R\Delta_0/T\Delta_0)^{(1-\beta)\beta j}.$$

In the formula (11), it is presumed that no transmission error occurs from the initial sampling instant to the current sampling instant j.

It should be noted here that each reference step size of the transmitting and the receiving sides is varied at the variation rate of about 100 Hz and, in other words, is dependent on an average value of about one hundred sampled values obtained at about one hundred successive sampling instants. If the number of the sampling instants is as small as ten, the step size $T\Delta_j$ may be regarded as equal to the step size $R\Delta_j$. Under the circumstances, the formula (11) is simply rewritten at the beginning of transmission into:

$$R\Delta_{j+1}/T\Delta_{j+1} = (R\Delta_{S0}/T\Delta_{S0})^{(1-\beta)(1+\beta+\cdots+\beta^{j-1}+\beta^j)} \approx \quad (12)$$

$$(R\Delta_{S0}/T\Delta_{S0})^\beta \approx 1.$$

From the formula (12), it is readily understood that noncoincidence of the step sizes at the sampling instant (j+1) is dependent on the reference step sizes selected on both sides at the beginning of the input signal and is almost negligible.

Let the transmission error take place in the method according to the second aspect of this invention. It is assumed that the transmission error appears at the sampling instant j and, as a result, quantized codes at the sampling instant j are different from each other on the transmitting and the receiving sides. The different quantized codes result in varying the reference step sizes in the transmitting and the receiving sides. Since each of the reference step sizes on both sides is varied at the rate dependent on the rate control signal limited to a frequency band less than 100 Hz, the reference step sizes on both sides are determined by the rate control signals derived from the different quantized codes. As a result, a difference between the reference step sizes on both sizes is proportional to energy attained from a difference between the different quantized codes. Such energy is derived by allowing an impulse signal representative of the difference of the quantized codes to pass through a low pass filter having a frequency band less than 100 Hz. Anyway, the impulse signal defines the difference between the reference step sizes on both sides and is variable at a frequency less than 100 Hz.

In general, the input signal, such as the audio signal, is limited to the frequency band less than 4 kHz and is sampled at a sampling signal having a repetition frequency of 8 kHz. Consideration will be described about a degree of an adverse influence of such an impulse signal which is exerted on each of the reference step sizes $T\Delta$ and $R\Delta$. Inasmuch as the energy of the impulse signal can be evaluated by electric power of the impulse signal as well as that of the input signal, the energy ratio of the impulse signal to the input signal is given by:

$$(100 \text{ Hz}/4000 \text{ Hz})^2 = 1/1600. \quad (13)$$

As shown in the formula (13), the impulse signal adversely affects the input signal at an extremely low rate of 1/1600 as usual. When the transmission error has a maximum level of a difference to be expected between the transmitting and the receiving sides, the impulse signal has a level equal to twice the dynamic range. However, the influence of the maximum level at most exerts on the dynamic range at the rate of 1/800. Therefore, the reference step sizes are rarely subjected to the influence of the transmission error, as long as any burst errors does not take place for a long time.

Even when an error remains between the transmitting and the receiving sides despite a relationship between the reference step sizes and the transmission error, such an error never accumulates with time if the audio signal is given as the input signal. This is because the audio signal is inevitably accompanied by the quiescent duration and the reference step sizes are restored again to the minimum step sizes $\Delta_{S0}$ on both of the transmitting and the receiving sides during the quiescent duration. As a result, both reference step sizes coincide with each other on the transmitting and the receiving sides.

At any rate an instantaneous error, such as the transmission error, is gradually attenuated or alleviated with time, as shown in the formula (7), provided that the reference step sizes are scarcely varied on both of the transmitting and the receiving sides on occurrence of the transmission error.

(9) First Embodiment (A) Quantization Circuit

Figure 3:
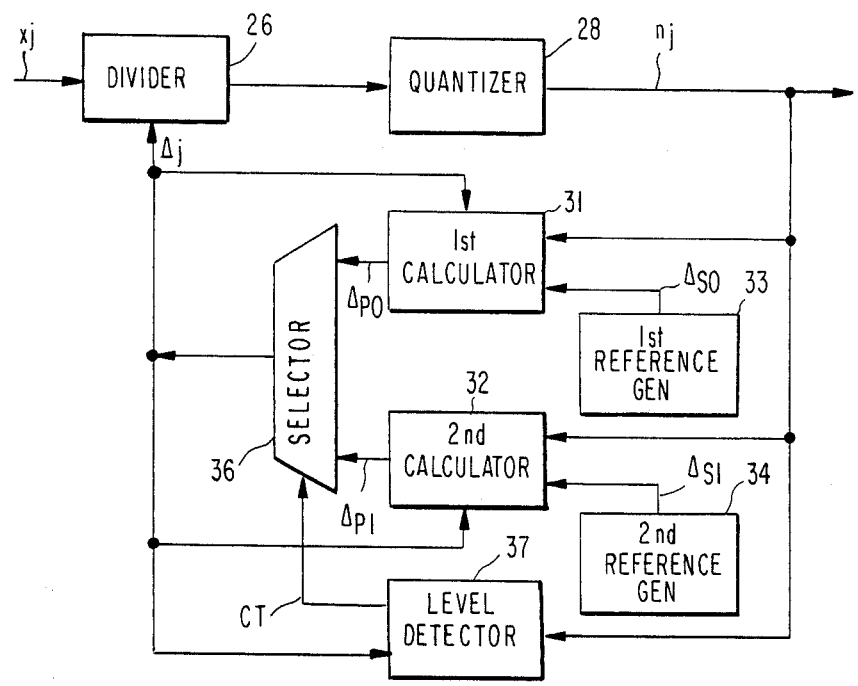
FIG. 3 is a block diagram of a quantization circuit according to a first embodiment of this invention.

Referring to FIG. 3, a forward quantization circuit (simply called a quantization circuit hereinafter) 25 according to a first embodiment of this invention is based on the first aspect of this invention and is for use in combination with a sampling circuit (not shown) and with a modulator (not shown). The quantization circuit 25 is supplied with a succession of sampled values as a succession of input signals x. Each sampled value is derived at every sampling instant by sampling an analog signal, such as an audio signal in the sampling circuit. A sampling period of the analog signal is equal to, for example, 125 microseconds and each sampling instant, therefore, appears at every sampling period of 125 microseconds.

It will be assumed that each sampled value is given from the sampling circuit as each input signal x in a digital form of w bits and a current one of the input signals at a current sampling instant j is represented by $x_j$. In the quantization circuit 25, the output signal succession is produced as a succession of quantized codes n each of which is represented by the number of m bits less than w bits and which appears at every sampling period in timed relation to the input signal succession. Herein, a current one of the quantized codes at the current sampling instant j is representative of a current one of the sampled values at the current sampling instant and indicated by $n_j$. Likewise, let a current one of the step sizes at the current sampling instant j be represented by $\Delta_j$ and appear as a current step size signal at the current sampling instant.

Supplied with the current input signal $x_j$ and the current step size signal $\Delta_j$ as a dividend and a divisor, respectively, a divider 26 divides the current quantized code representative of the current sample value, by the current step size in a digital manner to calculate a quotient and to produce a quotient digital signal representation of the quotient in the digital form. As the divider 26, use is possible of a divider described in "COS/MOS Memories, Microprocessors and Support Systems," pages 140-150, published August 1979 by RCA.

Coupled to the divider 26, a quantizer 28 has a plurality of threshold levels equal in number to $2^{m-1}$ and converts the digital signal into the current one of the output signals with reference to the threshold levels. As mentioned before, the current output signal is represented by a small number of bits in comparison with the input signal and is produced as the current quantized code. Such a quantizer 28 can be constituted by the use of a read-only memory (ROM) described in "Signetic Bipolar & MOS Memory Data Manual," pages 66–69, published 1979 by Signetics Corporation. Such an ROM serves to carry out quantization by converting the quotient digital signal of four bits into the output signal of two bits.

More particularly, the quotient digital signal of four bits is given to four of less significant bits of address input terminals attached to the above-mentioned ROM. The output signal of two bits is derived from two of less significant bits of output terminals derived from the ROM. In each address specified by the quotient digital signals of four bits, each digital signal of two bits is stored to be produced as each quantized code. Table 2 exemplifies the relationships between the quotient digital signal and the output signal given to and produced from the ROM. In Table 2, each input level represented by the quotient digital signal is enumerated on the leftmost column or the first column merely for reference. Each input level has one of sixteen levels between 1.75 and $-2.00$ and varied at every unit level of 0.25. Each quotient digital signal of four bits is representative of each input level and specified an address of the ROM. In this sense, the quotient digital signals may be called address signals as shown atop of the second column of Table 2. In each quotient digital signal, a decimal point is assumed to be present between the least significant but two and the least significant bit but three. The quantizer 28 deals with such a quotient digital signal as an integer with the decimal point removed and produces each output signal of two bits as shown in the third column of Table 2. Each output signal specifies one of output levels laid between 1 and $-2$, as shown in the rightmost or the fourth column of Table 2 merely for reference.

TABLE 2

| INPUT LEVELS | ADDRESS SIGNALS | OUTPUT SIGNALS | OUTPUT LEVELS |
|---|---|---|---|
| 1.75 | 0111 | 01 | 1 |
| 1.50 | 0110 | 01 | 1 |
| 1.25 | 0101 | 01 | 1 |
| 1.00 | 0100 | 01 | 1 |
| 0.75 | 0011 | 00 | 0 |
| 0.50 | 0010 | 00 | 0 |
| 0.25 | 0001 | 00 | 0 |
| 0.00 | 0000 | 00 | 0 |
| $-0.25$ | 1111 | 11 | $-1$ |
| $-0.50$ | 1110 | 11 | $-1$ |
| $-0.75$ | 1101 | 11 | $-1$ |
| $-1.00$ | 1100 | 11 | $-1$ |
| $-1.25$ | 1011 | 10 | $-2$ |
| $-1.50$ | 1010 | 10 | $-2$ |
| $-1.75$ | 1001 | 10 | $-2$ |
| $-2.00$ | 1000 | 10 | $-2$ |

Thus, a combination of the divider 26 and the quantizer 28 is operable to quantize the input signal succession into the output signal succession as a succession of the quantized codes n (suffixes omitted). As described before, the current quantized code $n_j$ is determined in relation to the current step size $\Delta_j$ appearing at the current instant j. Let the current step size $\Delta_j$ be decided from the current quantized code $n_j$ with reference to a previous step size $\Delta_{j-1}$ and a previous quantized code $n_{j-1}$ at a previous instant (j=1), as suggested by the formula (7). Although the reference size $\Delta_S$ is left out of consideration for the time being for convenience of description, the current step size $\Delta_j$ also depends on the reference size $\Delta_S$, as will become clear presently.

Anyway, the current output signal $n_j$ is delivered to the modulator and to first and second calculators 31 and 32 each of which is similar in structure to the other, as will shortly be described in detail, and both of which are operable in a manner as will also be described hereunder. The first calculator 31 is coupled to a first reference generator 33 and is supplied with a first reference signal representative of the first reference size $\Delta_{S0}$ described in conjunction with FIG. 2 while the second calculator 32 is coupled to a second reference generator 34 and is supplied with a second reference signal representative of the second reference size $\Delta_{S1}$. Both of the first and the second reference signals are indicated by the reference symbols similar to the first and the second reference sizes $\Delta_{S0}$ and $\Delta_{S1}$ without any introduction of confusion.

Each of the first and the second second calculators 31 and 32 serves to calculate the succeeding step size $\Delta_{j+1}$ next following the current step size $\Delta_j$ in accordance with the formula (7) at the next following instant (j+). For this purpose, the current step size $\Delta_j$ is supplied to both of the first and the second calculators 31 and 32. According to the first aspect of this invention, the succeeding step size $\Delta_{j+1}$ is a selected one of the first and the second reference sizes $\Delta_{S0}$ and $\Delta_{S1}$, as mentioned before.

In the quantization circuit 25, the first and the second calculators 31 and 32 concurrently calculate the following ones of step sizes with reference to the first and the second reference sizes $\Delta_{S0}$ and $\Delta_{S1}$, respectively. One of the calculated step sizes alone is selected as the succeeding step size $\Delta_{j+1}$. The calculated step sizes produced from the first and the second calculators 31 and 32 may, therefore, be referred to as a first and a second predictive size $\Delta_{P0}$ and $\Delta_{P1}$ for use in deciding the succeeding step size $\Delta_{j+1}$.

The first and the second predictive sizes $\Delta_{P0}$ and $\Delta_{P1}$ are calculated in accordance with the formula (7) in consideration of the first and the second reference sizes $\Delta_{S0}$ and $\Delta_{S1}$. At this time, the formula (7) is modified by the use of the first and the second reference sizes $\Delta_{S0}$ and $\Delta_{S1}$ into:

$$\Delta_{P1} = (\Delta_j/\Delta_{S0}) \cdot \Delta_{S0} \cdot M(n_j)$$

and $$\Delta_{P2} = (\Delta_j/\Delta_{S1}) \cdot \Delta_{S1} \cdot M(n_j), \qquad (7')$$

respectively.

Coupled to the first and the second calculators 31 and 32, a selector 36 is controlled by a level detector 37 to select one of the first and the second predictive sizes $\Delta_{P0}$ and $\Delta_{P1}$ as the succeeding reference size $\Delta_{j+1}$ (as will presently be described).

The quantized code succession n is also delivered from the quantizer 28 to the level detector 37. The level detector 37 monitors the quantized code succession to provide a level signal CT representative of, at the current instant j, a level dependent on a plurality of those ones of the quantized codes which precede the current quantized code and the previous code. The level detector 37 can be constituted by a circuit including a low pass filter, as will later be described in detail. Specifically, the selector 36 selects the first predictive size $\Delta_{P0}$ as the succeeding step size $\Delta_{j+1}$ when the level signal T has a level lower than a comparison reference level. The comparison reference level is equal to half of the sum of the first and the second reference sizes $\Delta_{S0}$ and $\Delta_{S1}$, that is, $(\Delta_{S0}+\Delta_{S1})/2$. Otherwise, the selector 37 selects the second predictive size $\Delta_{P2}$ as the succeeding step size $\Delta_{j+1}$.

The succeeding step size $\Delta_{j+1}$ is sent as the succeeding step size signal from the selector 36 to the divider 26 to divide the next following input signal $x_{j+1}$ by the succeeding step size $\Delta_{j+1}$. Such operation is repeated at every instant spaced by the sampling period. At any rate, each step size $\Delta$(suffix omitted) is dependent on the reference size specified by one of the first and the second reference sizes $\Delta_{S0}$ and $\Delta_{S1}$. When the reference size is switched from one of the first and the second reference sizes to the other one, the curves $22_0$ and $22_1$ are discretely changed over from one to the other. As a result, the quantization precision is remarkably improved in a high and a low level of the input signal.

In addition, the succeeding step size $\Delta_{j+1}$ is delivered to the first and the second calculators 31 and 32 to carry out calculation expressed by the formula (7'). In FIG. 3, the succeeding step size $\Delta_{j+1}$ is also given to the level detector 37 to reproduce the current input signal $x_j$ from the current quantized code $n_j$ again in the level detector 37. The reproduction of the input signal $x_j$ in the level detector 37 is helpful to derive the level accurately dependent on the preceding quantized codes, as will become clear later.

Figure 4:
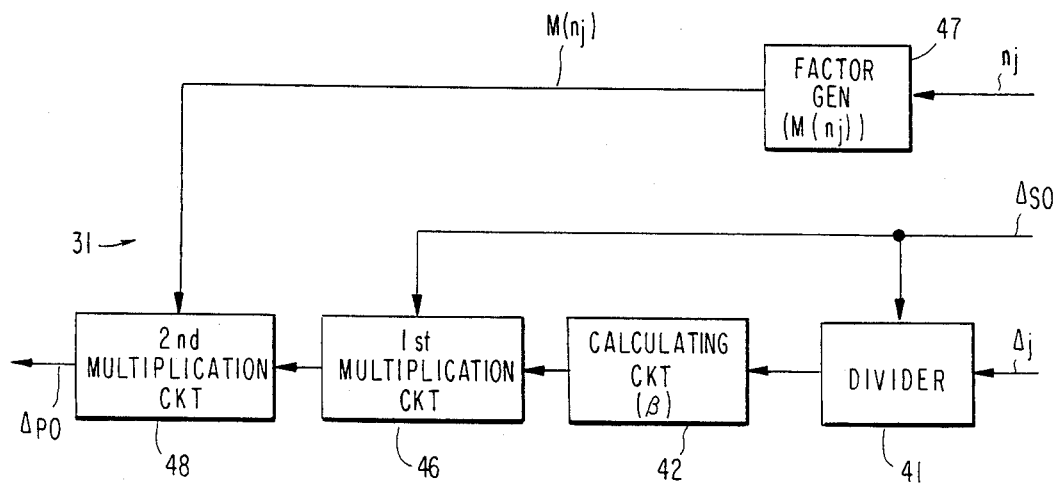
FIG. 4 is a block diagram of a first calculator which is used in the quantization circuit illustrated in FIG. 3.

Referring to FIG. 4, the first calculator 31 is for use in the quantization circuit 25 illustrated with reference to FIG. 3 and is similar in structure and operation to the second calculator 32. Accordingly, description will be omitted about the second calculator 32. In FIG. 3, the selector 36 and the first reference generator 33 produce a current size signal and the first reference signal representative of the current step size $\Delta_j$ and the first reference size $\Delta_{S0}$, respectively. Responsive to the current step size $\Delta_j$ and the first reference size $\Delta_{S0}$ given as a dividend and a divisor, respectively, a divider 41 divides the current step size $\Delta_j$ by the first reference size $\Delta_{S0}$ to produce an output signal representative of a result of division $(\Delta_j/\Delta_{S0})$. The divider 41 may be similar to that illustrated in FIG. 3.

The output signal is sent from the divider 1 to a calculating circuit 42 for raising the result of division $(\Delta_j/\Delta_{S0})$ to the power of $\beta$ to provide a calculation result $(\Delta_j/\Delta_{S0})^\beta$. The preselected number $\beta$ is smaller than one, as mentioned before. A first multiplication circuit 46 multiplies the calculation result $(\Delta_j/\Delta_{S0})^\beta$ by the first reference size $\Delta_{S0}$ to provide a value signal indicative of a value $(\Delta_j/\Delta_{S0})^\beta \cdot \Delta_{S0}$.

The current quantized code $n_j$ is delivered from the quantizer 28 to a factor generator 47. The generator 47 is operable to produce a multiplier or factor signal representative of each multiplier $M(n_j)$ which is exemplified in Table 1 and is dependent on the current quantized code $n_j$. Responsive to the multiplier signal and the value signal, a second multiplication circuit 48 multiplies the value $(\Delta_j/\Delta_{S0})^\beta$ by the multiplier of $M(n_j)$ to determine the first predictive size $\Delta_{P0}$ represented by the formula (7').

In this structure, each of the first and the second multiplication circuits 46 and 48 may be a multiplier described in "LSI Multipliers Data Sheet" published 1978 by TRW. The factor generator 47 may be formed by an ROM. In this case, the ROM stores the values $M(n_j)$ listed on Table 1 and is accessed by each quantized signal $n_j$ supplied as an address signal. Furthermore, it is possible to constitute the calculating circuit 42 by a ROM. The calculating circuit 42 is possibly given a fractional decimal value as the result of division with a decimal point accompanied by the decimal. If the result of division is represented by m bits and the decimal point is present between h-th bit and (h+1)-th bit as counted from the least significant bit, where m is larger than (h+1), each result of division is multiplied by $2^h$ so that it can be processed as each integer. As a result, the ROM is accessed by an address signal representative of each integer. As will readily be understood, the values $(\Delta_j/\Delta_{S0})$ to the power of $\beta$ are stored in each address specified by the address signal.

In the illustrated calculating circuit 42, the values $(\Delta_j/\Delta_{S0})^\beta$ are produced by the use of the ROM. If z is substituted for the ratio of $(\Delta_j/\Delta_{S0})$, the above-mentioned values can be represented by $z^\beta$. If the Taylor expansion is applied to the term of $z^\beta$ on condition that z is near to one, the term of $z^\beta$ is approximately expressed by:

$$z^\beta = 1 + \beta z, \qquad (14)$$

when the Taylor series is restricted to the two first terms thereof. By the use of the formula (14), the formula (7) is simply rewritten into:

$$\begin{aligned}\Delta_j + 1 &= M(n_j) \cdot \Delta_S \cdot [1 + \beta(\Delta_j/\Delta_S)] \\ &= M(n_j)(\Delta_S + \beta\Delta_j)\end{aligned} \qquad (15)$$

It is readily possible to carry out calculation in accordance with the formula (15). For example, a combination of the divider 41, the calculator circuit 42, and the first multiplication circuit 46 may be replaced by an adder between the reference size $\Delta_S$ and a multiplied value $\beta\Delta_j$. In the above-mentioned manner, a high quantization precision is accomplished with a transmission error alleviated.

Figure 5:
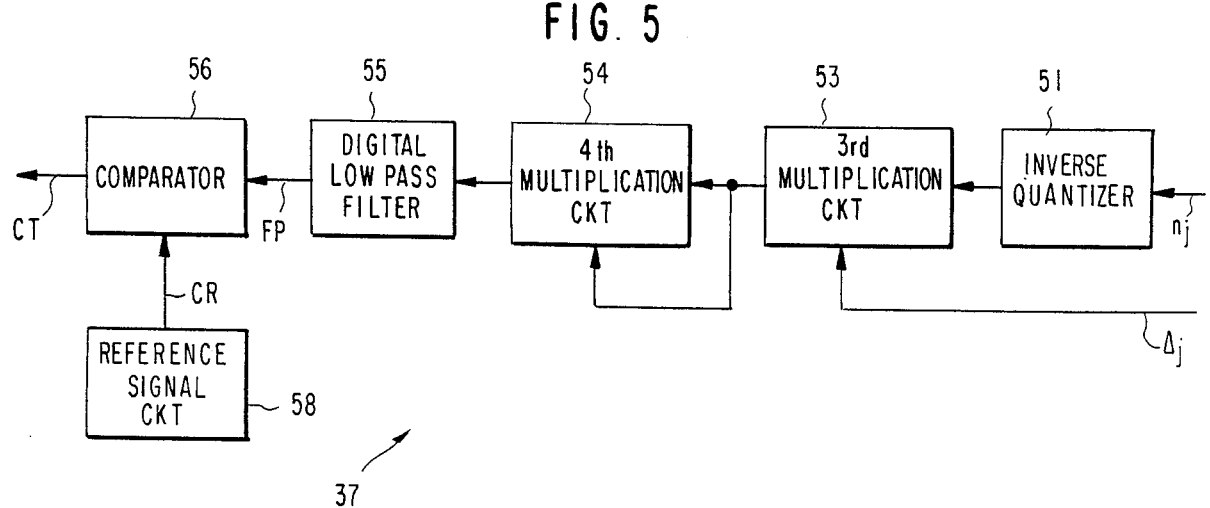
FIG. 5 shows a block diagram of a level detector which is used in the quantization circuit illustrated in FIG. 3.

Referring to FIG. 5, the level detector 37 is for use in the quantization circuit 25 illustrated in FIG. 3 and is responsive to the current quantized code $n_j$ and the current size signal representative of the current step size $\Delta_j$, as is the case with FIG. 3. The current quantized signal $n_j$ is supplied to an inverse quantizer 51 to be reproduced as a reproduction of the current input signal $x_j$. As described hereinabove, the number of bits in each input signal x is greater than that in each quantized code n. As suggested before, the quantized code n is inversely quantized or decoded into the reproduction of the quantized code. The reproduction of the quantized code is given by $(n_j + \frac{1}{2})$ in accordance with the formula (3). Such an inverse quantizer 51 can be implemented by ROM as exemplified by Table 3. As shown in Table 3, the ROM has four addresses specified by the two bits of the quantized code and produces output signals of four bits from each accessed address. Like in Table 2, the input levels and the output levels are shown in correspondence to the address and the output signals in Table 3, respectively.

TABLE 3

| INPUT LEVELS | ADDRESS SIGNALS | OUTPUT SIGNALS | OUTPUT LEVELS |
| --- | --- | --- | --- |
| 1 | 01 | 0110 | 1.50 |
| 0 | 00 | 0010 | 0.50 |
| −1 | 11 | 1110 | −0.50 |

TABLE 3-continued

| INPUT LEVELS | ADDRESS SIGNALS | OUTPUT SIGNALS | OUTPUT LEVELS |
|---|---|---|---|
| −2 | 10 | 1010 | −1.50 |

The reproduction of the current quantized code is supplied to a third multiplication circuit 53 together with the current size signal representative of the current step size $\Delta_j$. When the current step size $\Delta_j$ is multiplied by the reproduction of the current quantized code $n_j$, the current input signal $x_j$ be substantially reproduced by the third multiplication circuit 53 as a currently reproduced signal. The currently reproduced signal is sent from the third multiplication circuit 53 to a fourth multiplication circuit 54. The fourth multiplication circuit 54 calculates a square of each reproduced signal to derive energy or power (output of the low pass filter) dependent on the squares of the reproduced signals and to produce an electrical signal related to energy or power. Each of the third and the fourth multiplication circuits 53 and 54 may be similar in structure to each of the first and the second multiplication circuits 46 and 48 illustrated in FIG. 4. The electrical signal is sent to a digital low pass filter 55 exhibiting an impulse response longer than at least one sampling period. The digital low pass filter 55 is realized by a digital filter described in "Theory and Application of Digital Signal Processing," p. 306, FIG. 5.10, published 1975 by Prentice-Hall, Inc., Englewood Cliffs, N.J. When the electrical signal is allowed to pass through the digital low pass filter 56, a d.c. component can be produced from the digital low pass filter 55. The d.c. component has a level dependent on a plurality of those ones of the quantized codes which appear until the current quantized code, because of the impulse responsive of the digital low pass filter 55. Such a level is representative of energy which is allowed to pass through the digital low pass filter 55 during a short interval of time lasting a plurality of the sampling periods. The short interval of time may be called a duration of a syllable. The d.c. component is supplied on a filter output signal FP to a comparator 57 coupled to a reference signal circuit 58. The reference signal circuit 48 produces a comparison reference signal CR representative of the comparison reference level of $(\Delta_{S0}+\Delta_{S1})/2$. Responsive to the filter output signal FP and the comparison reference signal CR, the comparator 56 produces the level signal CT when the filter output signal FP has a level lower and not lower than the comparison reference level. Specifically, the level signal CT is indicative of selection of the first predictive size $\Delta_{P1}$ based on the first reference size $\Delta_{S0}$ when the level of the filter output signal FP is lower than the comparison reference level. Otherwise, the level signal CT is indicative of selection of the second predictive size $\Delta_{P2}$ based on the second reference size $\Delta_{S1}$. The comparator 56 may be an integrated circuit described in "The Bipolar Digital Integrated Circuits Data Book," pages 15-220 through 15-221 published 1981 by Texas Instruments Incorporated, Texas.

In the illustrated level detector 37, the inverse quantizer 51 is used to avoid any overload and to improve the quantization precision. However, a square of the current quantized code $n_j$ is directly calculated in the level detector 37 without both of the inverse quantizer 51 and the third multiplication circuit 53. In this case, the current quantized code $n_j$ is directly given to the fourth multiplication circuit 54 to calculate the square of the current quantized code $n_j$.

Alternatively, absolute values of the quantized codes or the reproductions of the input signals may be allowed to pass through the low pass filter to calculate energy during the duration of the syllable.

(B) Inverse Quantization Circuit

Figure 6:
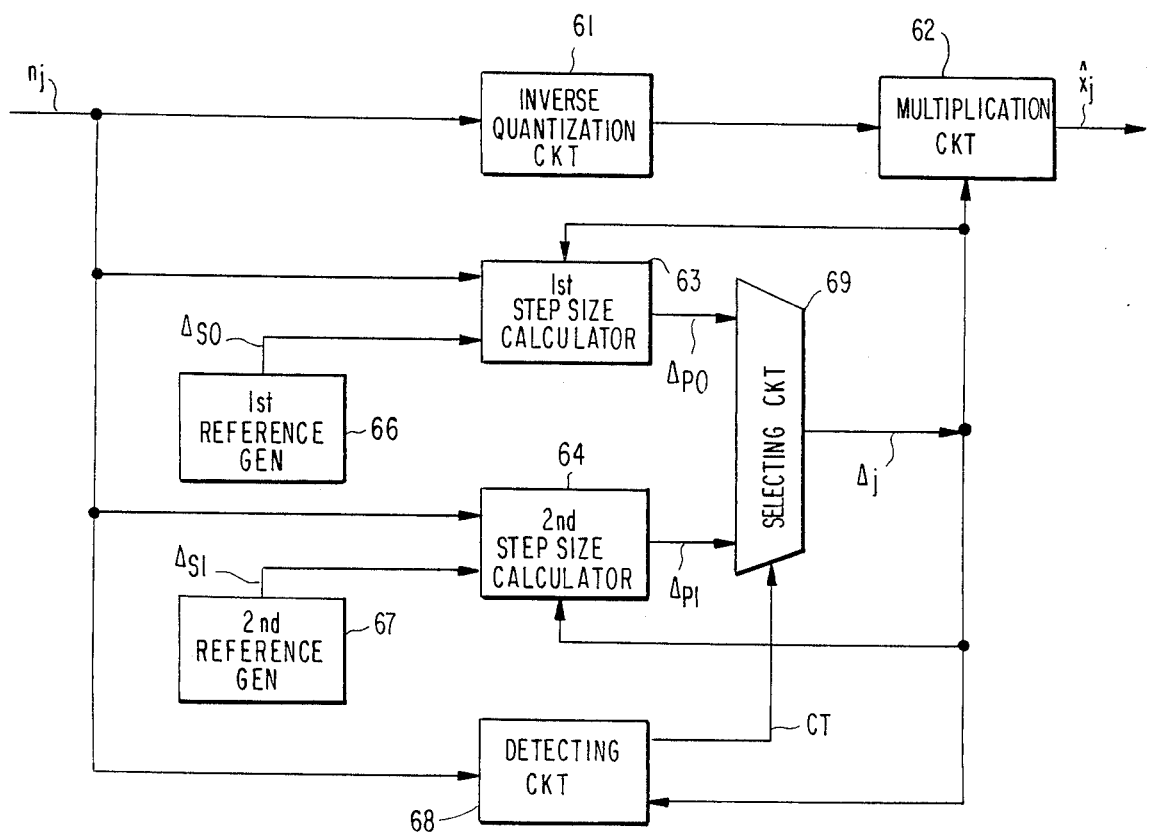
FIG. 6 is a block diagram of an inverse quantization circuit according to the first embodiment of this invention.

Referring to FIG. 6, an inverse quantization circuit 60 according to the first embodiment of this invention is for use in combination with the quantization circuit 25 illustrated in FIG. 3 and carries out inverse quantizing operation on the input signal succession to produce an output signal succession. In the inverse quantizing operation, the succession of the quantized codes is given as the input signal sequence to the inverse quantization circuit 60 and the current quantized code is, therefore, represented by $n_j$. The output signals are reproductions of the input signals x illustrated with reference to the quantization circuit 25 and are, therefore, indicated by x. Anyway, the inverse quantization circuit 60 is for disposing of the quantized codes n into the reproduced output signals x in timed relation to each other at successive instants spaced by the sampling period. When the instant j is representative of a current one of the instants, a current one of the quantized codes, a current one of the reproduced output signals, and a current one of the step sizes are represented by $n_j$, $x_j$, and $\Delta_j$, respectively.

In FIG. 6, the inverse quantization circuit 60 comprises an inverse quantizer 61 for inversely quantizing or decoding the quantized codes n into inversely quantized or decoded codes. As the inverse quantizer 61, use can be made of the inverse quantizer 51 used in the level detector 37 illustrated in FIG. 5. The inversely quantized code is supplied to a multiplication circuit 62 together with a current size signal representative of the current step size $\Delta_j$. The multiplication circuit 61 multiplies the inversely quantized code by the current step size $\Delta_j$ to produce the current one $x_j$ of the reproduced output signal succession. Thus, a combination of the inverse quantizer 61 and the multiplication circuit 62 serves to carry out inverse quantization of the quantized codes n.

The inverse quantization circuit 60 further comprises first and second step size calculators 63 and 64 similar in structure and operation to the first and the second calculators 31 and 32, respectively. The first and the second step size calculators 63 and 64 are coupled to first and second reference generators 66 and 67 similar to the generators 33 and 34 illustrated with reference to FIG. 3, respectively, and are responsive to first and second reference signals representative of first and second reference sizes $\Delta_{S0}$ and $\Delta_{S1}$ equal to those described in conjunction with FIG. 3. As is the case with the first calculator 31, the first step size calculator 63 calculates a first predictive size $\Delta_{P0}$ with reference to the current quantized code $n_j$, the current step size $\Delta_j$, and the first reference size $\Delta_{S0}$ to produce a first predictive signal representative of the first predictive size $\Delta_{P0}$. Likewise, the second step size calculator 64 produces a second predictive signal representative of the second reference size $\Delta_{P1}$. Both of the first and second reference sizes $\Delta_{P0}$ and $\Delta_{P1}$ are dependent on the first and second reference sizes $\Delta_{S0}$ and $\Delta_{S1}$, respectively. In any event, calculations in the first and the second step size calculators 63 and 64 are carried out in accordance with the formula (7').

The inverse quantization circuit 60 comprises a detecting circuit 68 similar to the detector 37 illustrated in FIG. 3 and having a structure illustrated in FIG. 5. The detecting circuit 68 derives a level dependent on the quantized codes which appear upon the current quantized code $n_j$. The level is supplied as a level signal CT to a selecting circuit 69 similar to the selector 36 illustrated in FIG. 3. Responsive to the level signal CT, the selecting circuit 69 selects one of the first and the second predictive sizes $\Delta_{P0}$ and $\Delta_{P1}$ as the succeeding step size $\Delta_{j+1}$ at the next following instant following the current instant j. The multiplication circuit 62 may be similar to the third multiplication circuit 53.

Herein, the inverse quantizer 61 converts the current quantized code $n_j$ into the decoded code having the number of bits greater than that of the current quantized code $n_j$. Inasmuch as the decoded code is multiplied by the current step size $\Delta_j$ in the multiplication circuit 62, the current one of the reproduced output signal $\hat{x}$ is calculated in accordance with the formula (3) and is indicated by $(n_j + \frac{1}{2}) \cdot \Delta_j$.

In the first and the second step size calculators 63 and 64, the first and the second predictive sizes $\Delta_{P0}$ and $\Delta_{P1}$ are approximated by the use of Taylor expansion described in conjunction with the first calculator 31 illustrated in FIG. 4.

(10) Second Embodiment

(A) Quantization Circuit

Figure 7:
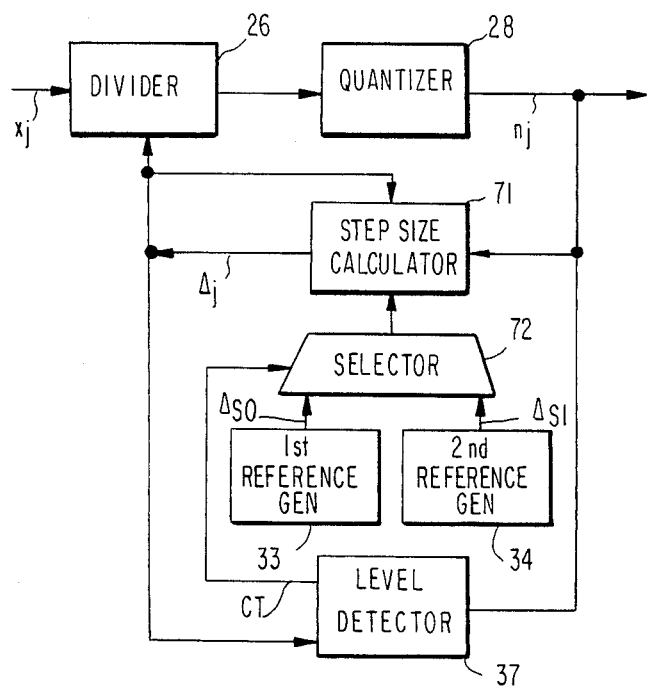
FIG. 7 is a block diagram of a quantization circuit according to a second embodiment of this invention.

Referring to FIG. 7, a quantization circuit according to a second embodiment of this invention is based on the first aspect of this invention and is similar to that illustrated with reference to FIG. 3 except that a single step size calculator designated by 71 is substituted for the first and the second calculators 31 and 32 and that a selector 72 is coupled to both the first and the second reference generators 33 and 34. The selector 72 is supplied with the first and the second reference signals representative of the first and the second reference sizes $\Delta_{S0}$ and $\Delta_{S1}$, respectively. Responsive to the first and the second reference signals, the selector 72 selects one of the first and the second reference sizes $\Delta_{S0}$ and $\Delta_{S1}$ in the manner described in conjunction with FIG. 3.

Supplied with the selected one of the first and the second reference sizes $\Delta_{S0}$ and $\Delta_{S1}$, the single step size calculator 71 is operated in a time division fashion to calculate the succeeding step size $\Delta_{j+1}$ next following the current step size $\Delta_j$, with reference to the current quantized code $n_j$ and the current step size $\Delta_j$. The succeeding step size $\Delta_{j+1}$ is directly delivered as a succeeding step size signal to the divider 26, the level detector 37, and the step size calculator 71.

One of the calculators is quiescent during calculation of the other calculator even when two calculators are included in the quantization circuit 25, as shown in FIG. 3.

Such time divisional operation is, therefore, accomplished by the single step size calculator 71 similar in structure to the first calculator 31 illustrated in FIG. 4.

(B) Inverse Quantization Circuit

Figure 8:
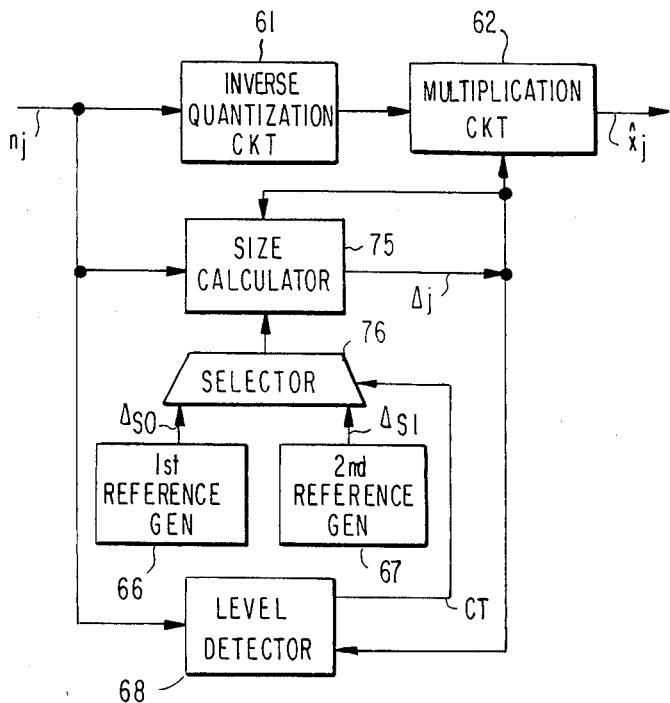
FIG. 8 is a block diagram of an inverse quantization circuit for use in combination with the quantization circuit illustrated in FIG. 7.

Referring to FIG. 8, an inverse quantization circuit according to the second embodiment of this invention is for use in combination with the quantization circuit illustrated with reference to FIG. 7 and is similar to that illustrated in FIG. 6 except that a single size calculator 75 is substituted for the first and the second step size calculators 63 and 64 and a selector 76 is coupled to the first and the second reference generators 66 and 67. As is the case with the selector 72 illustrated in FIG. 7, the selector 76 is operable to select one of the first and second reference sizes $\Delta_{S0}$ and $\Delta_{S1}$ in response to the level signal CT supplied from the level detector 68 similar in structure to that illustrated with reference to FIG. 5.

(11) Third Embodiment

(A) Quantization Circuit

Figure 9:
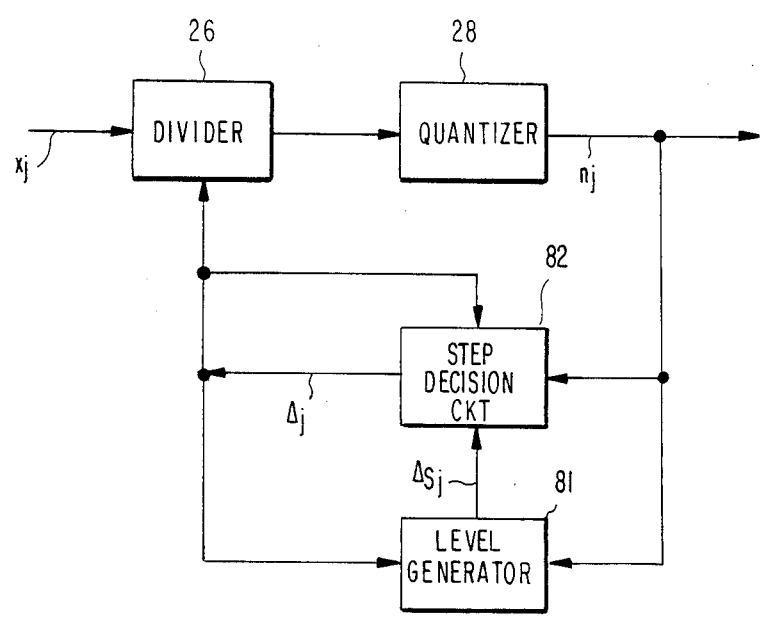
FIG. 9 is a block diagram of a quantization circuit according to a third embodiment of this invention.

Referring to FIG. 9, a forward quantization circuit according to a third embodiment of this invention is based on the second aspect of this invention previously mentioned and comprises similar parts designated by like reference numerals. As in the cases with the quantization circuits illustrated in FIGS. 3 and 7, the divider 26 and the quantizer 28 serve to quantize a succession of input signals x into a succession of output signals produced as a succession of quantized codes n, with reference to step sizes $\Delta$. The input signals x appear in timed relation to the output signals n, respectively. Thus, each code of the quantized code succession is synchronized with each input signal of the input signal succession that is produced at every instant spaced by the sampling period. The divider 26 and the quantizer 28 may be similar in structure to those illustrated with reference to FIG. 3. Eventually, a current one of the input signals and a current one of the quantized codes are given by $x_j$ and $n_j$ at a current one of the instants, as suggested by the formula (1) which defines a relationship between the input signals and the quantized codes. Although no further description will not be made about the divider 26 and the quantizer 28, the divider 26 may be a divider described in "Bipolar LSI 1982 Data Book," pages 11-3 through 11-22 published 1982 by MMI and the quantizer 28 may be constituted by ROM used as the quantizer 28 used in FIG. 3.

The illustrated quantizer comprises a level generator 81, like the level detectors 37 illustrated in FIGS. 3 and 7. However, the level generator 81 does not produce discrete reference sizes, such as $\Delta_{S0}$ and $\Delta_{S1}$ but produces a reference size continuously varied with time. The reference size depends on the level of the quantized codes which appear until the current quantized code. Accordingly, the reference size at the current instant j is represented by $\Delta_{Sj}$.

Such a level generator 81 is equivalent to the level detector 37 illustrated in FIG. 5, with the comparator 56 and the reference signal circuit 58 removed from FIG. 5. Therefore, the level generator 81 per se is not explicitly illustrated. As to the level generator 81, it may be understood that the filter output signal FP is directly produced as a reference size signal representative of the reference size $\Delta_{Sj}$. In the illustrated quantization circuit 25, the reference size $\Delta_{Sj}$ is determined by the quantized codes and the previous step size but it can be specified by only the quantized codes, as mentioned in conjunction with FIG. 5. Briefly, the reference size $\Delta_{Sj}$ is dependent on a plurality of the quantized codes appearing until the current quantized code and is slower at a rate of variation than the sampling period. This is because variation of the reference size $\Delta_{Sj}$ is related to a plurality of the sampling periods. It may, therefore, be said that the variation of the reference size $\Delta_{Sj}$ is dependent on a syllabic duration in consequence of allowing the quantized codes or the reproduced codes to pass through the digital low pass filter 55.

If the input signal succession takes an average level, quantization is carried out along the curve 22 shown in FIG. 2. On the other hand, the curve 22 is continuously and slowly shifted between the curves $22_0$ and $22_1$, when the input signal succession has a lower and a higher level than the average level, respectively.

In FIG. 9, the reference size signal is given to a step size decision circuit 82 together with the current quantized code $n_j$ and the current step size $\Delta_j$. The step size decision circuit 82 calculates the succeeding step size $\Delta_{j+1}$ at the next following instant (j+1) in accordance with the formula (7) to produce a succeeding size signal representative of the succeeding step size $\Delta_{j+1}$. Calculation of the formula (7) can be possible by the use of each of the first and the second calculators 31 and 32 that is illustrated with reference to FIG. 4. Therefore, each of the first and the second calculators 31 and 32 may be used as the step size decision circuit 82. However, it is to be noted here that the decision circuit 82 produces the succeeding step size $\Delta_{j+1}$ as the output signal, in place of the predictive size of each calculator 31 or 32.

The succeeding step size $\Delta_{j+1}$ is delivered to the divider 26, the level generator 81, and the step size decision circuit 82 to quantize the succeeding one of the input signals at the next following instant spaced by the sampling period. Thus, similar operation is iteratively carried out in the quantization circuit of FIG. 3, with the reference size $\Delta_{Sj}$ determined by the curve 22 varied with time.

(B) Inverse Quantization Circuit

Figure 10:
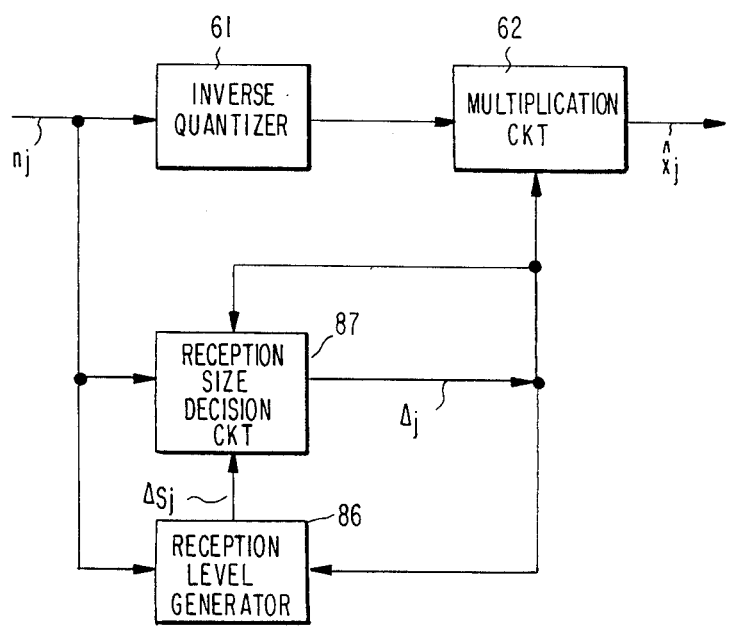
FIG. 10 is a block diagram of an inverse quantization circuit for use in combination with the quantization circuit illustrated in FIG. 9.

Referring to FIG. 10, an inverse quantization circuit according to the third embodiment of this invention is for use in combination with the quantization circuit illustrated in FIG. 9 and comprises similar parts designated by like reference numerals shown in FIG. 6. Inasmuch as the inverse quantizer 61 and the multiplication circuit 62 have already been described in detail in connection with FIGS. 6 and 8, description will be omitted about these elements 61 and 62 here.

The illustrated inverse quantization circuit comprises a reception level generator 86 and a reception size decision circuit 87 which are similar in structure to the level generator 81 and the step size decision circuit 87, respectively. The reception level generator 86 is supplied with the quantized code succession n as the input succession. The reception level generator 86 determines the reference size $\Delta_{Sj}$ with reference to the input signal succession and additionally to the current step $\Delta_j$ in a manner similar to that illustrated with reference to FIG. 9. The reference size $\Delta_{Sj}$ is varied at a rate slower than the sampling period by the above-mentioned reason and is produced as the reference size signal.

Responsive to the reference size signal and the quantized code succession n given as the input signal succession, the reception size decision circuit 87 calculates the succeeding step size $\Delta_{j+1}$ in accordance with the formula (7) to produce a succeeding size signal representative of the succeeding step size $\Delta_{j+1}$. Responsive to the succeeding step size signal, the multiplication circuit 62 multiplies the decoded code by the succeeding step size $\Delta_{j+1}$ to produce the reproduction $x_{j+1}$ of the input signal $x_{j+1}$ produced at the quantization circuit 25. Such a reproduction $x_{j+1}$ is given by $(n_{j+1}+\frac{1}{2}) \cdot \Delta_{j+1}$ because the decoded code supplied from the inverse quantizer 61 is represented by $(n_{j+1}+\frac{1}{2})$ in accordance with the formula (3). The reproduction $x_{j+1}$ is supplied to a demodulator (not shown).

Thus, a number of elements used in the quantization circuit can be interchanged with those element of the inverse quantization circuit. Nonlinear quantization and inverse quantization are readily accomplished with this invention. Furthermore, calculation is simplified to determine the step sizes by application of an approximate expression, such as the first and the second terms of the Taylor expansion. A wide variety of band reduction methods may be used in combination with the quantization and the inverse quantization according to this invention. The sampled value supplied as the input signal to the quantization circuit according to this invention may be previously encoded by the use of a predictor by application of a differential encoding method. In addition, each of the quantization and the inverse quantization circuits may be structured by a microprocessor operably by software.

While this invention has thus far been described in conjunction with a few embodiments thereof, it is readily possible for those skilled in the art to put this invention into practice in various manners. For example, more than two reference sizes may be discretely switched from one to the other in the first embodiment illustrated in FIGS. 3 and 6. Each input signal may be supplied to the quantization circuit 25 in an analog form while each output signal may be produced in an analog form from the inverse quantization circuit. In FIG. 5, the digital low pass filter may be replaced by an analog low pass filter.

What is claimed is:

1. A method of carrying out a forward quantizing operation by processing a succession of input digital signals into a succession of digital quantized codes, respectively, said digital quantized codes being disposed at successive instants spaced by a predetermined interval of time, respectively, in relation to step sizes which are decided at the respective instants with a current one of step sizes decided for disposition of a current one of said quantized codes at a current one of said instants with reference to a previous step size, a previous quantized code, and a preselected number smaller than unity, said previous step size being one of said step sizes that is decided at a previous instant, said previous instant being one of said instants that is said predetermined interval prior to said current instant, said previous quantized code being one of said quantized codes that is disposed at said previous instant, said forward quantizing operation comprising the steps of:

monitoring said quantized code succession to provide a level signal representative of, at said current instant, a level dependent on particular ones of said quantized codes that precede said current quantized code and include said previous quantized code;

setting a reference size variable at a predetermined period longer than said predetermined interval and adjusted in accordance with said level;

deciding the step size at a subsequent one of said instants that is said predetermined interval after said current instant, with reference to said current quantized code and said current step size and additionally to said reference size;

dividing said input signals by the step size to produce a sequence of quotient digital signals representative of quotients which appear as results of the division, respectively; and quantizing said quotient signals into said digital quantized codes, respectively.

2. A method as claimed in claim 1, wherein said setting step comprises the steps of:
   preparing a plurality of size levels each of which is different from the others and which are determined in consideration of said reference size; and
   selecting one of said size reference levels as said reference size in response to said level signal.

3. A method of carrying out an inverse quantizing operation by processing a succession of digital input signals into a succession of digital quantized codes, respectively, said digital quantized codes being disposed at successive instants spaced by a predetermined interval of time, respectively, in relation to step sizes which are decided at the respective instants with a current one of said step sizes decided for disposition of a current one of said quantized codes at a current one of said instants with reference to a previous step size, a previous quantized code and a preselected number smaller than unity, said previous step size being one of said step sizes that is decided at a previous instant, said previous instant being one of said instants that is said predetermined interval prior to said current instant, said previous quantized code being one of said quantized codes that is disposed at said previous instant, said inverse quantizing operation comprising the steps of:
   monitoring said quantized code succession to provide a level signal representative of, at said current instant, a level dependent on particular ones of said quantized codes that precede said current quantized code and include said previous quantized code;
   setting a reference size variable at a predetermined period longer than said predetermined interval and adjusted in accordance with said level;
   deciding the step size at a subsequent one of said instant that is said predetermined interval after said current instant, with reference to said current quantized code and said current step size and additionally to said reference size; and
   multiplying the current quantized code by the current step size.

4. A forward quantizing circuit for carrying out a forward quantizing operation by processing a succession of digital input signals into a succession of digital quantized codes, respectively, said quantized codes being disposed at successive instants spaced by a predetermined interval of time, respectively, in relation to step sizes which are decided at the respective instants with a current one of said step sizes decided for disposition of a current one of said quantized codes at a current one of said instants with reference to a previous step size, a previous quantized code and a preselected numer smaller than unity, said previous step size being one of said step sizes that is decided at a previous instant, said previous instant being one of said instants that is said predetermined interval prior to said current instant, said previous quantized code being one of said quantized codes that is disposed at said previous instant, said forward quantizing circuit comprising:
   quantizing means responsive to said input signal succession and a succession of said step sizes for producing said quantized code succession with reference to said step sizes;
   monitoring means responsive to the quantized code succession produced by said quantizing means for monitoring particular ones of the last-mentioned quantized codes that include said previous quantized code and precede said current quantized code to produce a level signal having a level dependent on said particular quantized codes;
   step size calculation means responsive to said level dependent signal and said quantized code succession for calculating the step size at the subsequent instant with reference to said current quantized code and said current step size together with a reference size variable at a predetermined period longer than said predetermined interval to produce a subsequent step size signal representative of the step size produced at said subsequent instant; and
   means for supplying said quantizing means with said subsequent step size signal as one of said step size signals, said quantizing means having divider means for dividing said digital input signals by said current step size.

5. A forward quantization circuit as claimed in claim 4, wherein said stepsize calculating means comprises:
   generating means for generating a plurality of size reference levels signals each of which is representative of the reference size different from one another; and
   step size deciding means responsive to said quantized code succession and coupled to said generating means for deciding the step size at said subsequent instant with reference to said current quantized code and said current step size and additionally to said reference size specified by one of said size reference signals to produce said subsequent step size.

6. A forward quantization circuit as claimed in claim 4, wherein said level signal is continuously variable at said predetermined period and is made to correspond to said reference size;
   said step size calculating means comprising:
   means responsive to said level signal and said quantized code succession for deciding the step size at the subsequent instant with reference to said current quantized code and said current step size in consideration of said reference size to produce said subsequent step size signal.

7. A quantization circuit as claimed in claim 5, wherein said step size deciding means comprises:
   first means responsive to said quantized code succession and a first one of said size reference level signals for calculating a first size level from said current quantized code and said first size level in consideration of said current step size to produce a first size level signal representative of said first size level;
   second means responsive to said quantized code succession and a second one of said size reference level signals for calculating a second size level from said current quantized code and said second size reference level in consideration of said current step size to produce a second size level signal representative of said second size level; and
   selecting means coupled to said first and said second means and responsive to said level signal for selecting one of said first and said second size levels with reference to said level signal to produce the subsequent step size signal representative of the selected one size level, the selected one size level being dependent on said reference level defined by said one size reference level selected from said size reference levels.

8. A quantization circuit as claimed in claim 5, wherein said step size deciding means comprises:

defining means responsive to said level signal and coupled to said generating means for defining one of said size reference levels as said reference size to produce a reference size signal representative of said reference size; and step size calculating means responsive to said quantized code succession, said reference size signal, and said level signal for calculating the step size at said subsequent instant with reference to said current quantized code, said current step size, and said reference size.

9. An inverse quantization circuit for use in carrying out an inverse quantizing operation by processing a succession of digital quantized codes into a succession of digital output signals, respectively, said quantized codes being disposed at successive instants spaced by a predetermined interval of time, respectively, in relation to step sizes which are decided at the respective instants with a current one of said step sizes decided for disposition of a current one of said quantized codes at a current one of said instants with reference to a previous step size and previous quantized code, said previous step size being one of said step sizes that is decided at a previous instant, said previous instant being one of said instants that is said predetermined interval prior to said current instant, said previous quantized code being one of said quantized codes that is disposed at said previous instant, said inverse quantization circuit comprising:

inverse quantizing means responsive to said quantized code succession and a succession of step size signals representative of a succession of said step sizes for carrying out said inverse quantization of said quantized code succession to produce said output signal succession;

reception level monitoring means for monitoring said quantized code succession to provide a level signal representative of, at said current instant, a level dependent on particular ones of said quantized codes that precede said current quantized code and include said previous quantized code;

step size calculation means coupled to said reception level monitoring means and responsive to said quantized code succession for calculating the step size at the subsequent instant with reference to said current quantized code and said current step size and additionally to a reference size variable which is set at a predetermined period longer than said predetermined interval to produce a subsequent one of said step size signals that is representative of the step size appearing at said subsequent instant;

means for supplying said inverse quantizing means with said subsequent step signl as one of said step size signals, said inverse quantizing means having means for multiplying the current step size by the current quantized code.

10. An inverse quantization circuit as claimed in claim 9, wherein said step size calculation means comprises:

step size producing means for producing a plurality of step size signals each of which is representative of the reference size different from one another;

reception step size determining means responsive to said quantized code succession and said level signal and coupled to said step size producing means for determining the step size at the subsequent instant with reference to said current quantized code and said current step size in consideration of said reference size represented by each of said step size signals to produce said subsequent one of the step size signals.

11. An inverse quantization circuit as claimed in claim 9, wherein said level signal is continuously variable at said predetermined period and is made to correspond to said reference signal;

said step size producing means comprising:

deciding means responsive to said level signal and said quantized code succession for deciding the step at the subsequent instant with reference to said current quantized code and said current step size in consideration of said reference size specified by said level signal to produce said subsequent one of the step size signals.

12. An inverse quantization circuit as claimed in claim 10, wherein said reception step size means comprises:

first calculating means responsive to said quantized code succession and a first one of said step size signals representative of a first one of said preselected step sizes for calculating a first size value from said current quantized code and said current step size with reference to said first preselected step size to produce a first size signal representative of said first size value;

second calculating means responsive to said quantized code succession and a second one of said step size signals representative of a second one of said preselected step sizes from said current quantized code and said current step size with reference to said second preselected step size to produce a second size signal representative of said second size value;

selecting means coupled to said first and said second calculating means and responsive to said level signal for selecting a selected one of said first and said second size values as the step size produced at the subsequent instant to make said selected one size value depend on a selected one of said first and said second preselected step sizes that defines said reference size and to produce said selected one size value as said subsequent step size signal.

13. An inverse quantization circuit as claimed in claim 10, wherein said reception step size means comprises:

selecting means coupled to said step size producing means and responsive to said level signal for selecting one of said preselected step sizes with reference to said level signal to define said reference size represented by said one preselected step size and to produce a reference size signal representative of said reference size; and calculating means responsive to said quantized code succession and said reference size signal for calculating the step size at the subsequent instant in consideration of said current quantized code and said reference size.

14. A method of carrying out a forward quantizing operation by processing a succession of input analog signals into digital quantized codes, respectively, said digital quantized codes being disposed at successive instants spaced by a predetermined interval of times, respectively, in relation to step sizes which are decided at the respective instants with a current one of step sizes decided for disposition of a current one of said quantized codes at a current one of said instants with reference to a previous step size, a previous quantized code, and a preselected number smaller than unity, said previous step size being one of said step sizes that is decided at a previous instant, said previous instant being one of said instants that is said predetermined interval prior to said current instant, said previous quantized code being one of said quantized codes that is disposed at said previous instant, said forward quantizing operation comprising the steps of:

monitoring said quantized code succession to provide a level signal representative of, at said current instant, a level dependent on particular ones of said quantized codes that precede said current quantized code and include said previous quantized code;

setting a reference size variable at a determined period longer than said predetermined interval and adjusted in accordance with said level;

deciding the step size at a subsequent one of said instants that is said predetermined interval after said current instant, with reference to said current quantized code and said current step size and additionally to said reference size;

dividing said input analog signals by the step size to produce a sequence of quotient digital signals representative of quotients which appear as results of the division, respectively; and quantizing said quotient signals into said digital quantized codes, respectively.

15. A method as claimed in claim 14, wherein said setting step comprises the steps of:

preparing a plurality of size levels each of which is different from the others and which are determined in consideration of said reference size; and selecting one of said size reference levels as said reference size in response to said level signal.

16. A forward quantizing circuit for carrying out a forward quantizing operation by processing a succession of analog input signals into a succession of digital quantized codes, respectively, said quantized codes being disposed at successive instants spaced by a predetermined interval of time, respectively, in relation to step sizes which are decided at the respective instants with a current one of said step sizes decided for disposition of a current one of said quantized codes at a current one of said instants with reference to a previous step size, a previous quantized code and a preselected number smaller than unity, said previous step size being one of said step sizes that is decided at a previous instant, said previous instant being one of said instants that is said predetermined interval prior to said current instant, said previous quantized code being one of said quantized codes that is disposed at said previous instant, said forward quantizing circit comprising:

quantizing means responsive to said input signal succession and a succession of said step sizes for producing said quantized code succession with reference to said step sizes;

monitoring means responsive to the quantized code succession produced by said quantizing means for monitoring particular ones of the last-mentioned quantized codes that include said previous quantized code and precede said current quantized code to produce a level signal having a level dependent on said particular quantized codes;

step size calculating means responsive to said level dependent signal and said quantized code succession for calculating the step size at the subsequent instant with reference to said current quantized code and said current step size together with a reference size variable at a predetermined period longer than said predetermined interval to produce a subsequent step size signal representative of the step size produced at said subsequent instant; and means for supplying said quantizing means with said subsequent step size signal as one of said step size signals, said quantizing means having means for dividing said input analog signals by said current step size to produce said succession of digital quantized codes.

17. A forward quantization circuit as claimed in claim 16, wherein said step size calculating means comprises:

generating means for generating a plurality of size reference levels signals each of which is representative of the reference size different from one another; and step size deciding means responsive to said quantized code succession and coupled to said generating means for deciding the step size at said subsequent instant with reference to said current quantized code and said current step size and additionally to said reference size specified by one of said size reference signals to produce said subsequent step size.

18. A forward quantization circuit as claimed in claim 16, wherein said level signal is continuously variable at said predetermined period and is made to correspond to said reference size;

said step size calculating means comprising:

means responsive to said level signal and said quantized code succession for deciding the step size at the subsequent instant with reference to said current quantized code and said current step size in consideration of said reference size to produce said subsequent step size signal.

19. A quantization circuit as claimed in claim 18, wherein said step size deciding means comprises:

first means responsive to said quantized code succession and a first one of said size reference level signals for calculating a first size level from said current quantized code and said first size level in consideration of said current step size to produce a first size level signal representative of said first size level;

second means responsive to said quantized code succession and a second one of said size reference level signals for calculating a second size level from said current quantized code and said second size reference level in consideration of said current step size to produce a second size level signal representative of said second size level; and selecting means coupled to said first and second means and responsive to said level signal for selecting one of said first and said second size levels with reference to said level signal to produce the subsequent step size signal representative of the selected one size level, the selected one size level being dependent on said reference level defined by said one size reference level selected from said size reference levels.

20. A quantization circuit as claimed in claim 18, wherein said step size deciding means comprises:

defining means responsive to said level signal and coupled to said generating means for defining one of said size reference levels as said reference size to produce a reference size signal representative of said reference size; and step size calculating means responsive to said quantized code succession, said reference size signal, and said level signal for calculating the step size at said subsequent instant with reference to said current quantized code, said current step size, and said reference size.

* * * * *

UNITED STATES PATENT AND TRADEMARK OFFICE
CERTIFICATE OF CORRECTION

PATENT NO. : 4,862,173
DATED : August 29, 1989
INVENTOR(S) : NISHITANI

It is certified that error appears in the above-identified patent and that said Letters Patent is hereby corrected as shown below:

Column 1, line 41, delete "produced" insert --reproduced--;

Column 4, line 6, delete "x;" insert --$\hat{x}$--;

Column 4, line 10, delete "$x_j$" insert --$\hat{x}_j$--;

Column 4, line 12, delete "$x_j$" insert --$\hat{x}_j$--;

Column 8, line 34, delete "22" insert --$22_1$--;

Column 9, line 62, delete "curves 22" insert --curve 22--;

Column 17, line 32, delete "56" insert --55--;

UNITED STATES PATENT AND TRADEMARK OFFICE
CERTIFICATE OF CORRECTION

PATENT NO. : 4,862,173
DATED : August 29, 1989
INVENTOR(S) : NISHITANI

It is certified that error appears in the above-identified patent and that said Letters Patent is hereby corrected as shown below:

Column 17, line 45, delete "48" insert --58--;

Column 18, line 21, delete "x" insert --$\hat{x}$--;

Column 18, line 23, delete "x" insert --$\hat{x}$--;

Column 18, line 28, delete "$x_j$" insert --$\hat{x}_j$--;

Column 18, line 40, delete "$x_j$" insert --$\hat{x}_j$--;

Column 21, line 62, delete "$x_j$" insert --$\hat{x}_j$--;

Column 21, line 64, delete "$x_j$" insert --$\hat{x}_j$--;

Column 21, line 67, delete "$x_j$" insert --$\hat{x}_j$--;

UNITED STATES PATENT AND TRADEMARK OFFICE
CERTIFICATE OF CORRECTION

PATENT NO. : 4,862,173

DATED : August 29, 1989

INVENTOR(S) : NISHITANI

It is certified that error appears in the above-identified patent and that said Letters Patent is hereby corrected as shown below:

Column 21, line 64, delete "$x_j$" insert --$\hat{x}_j$--;

Column 21, line 67, delete "$x_j$" insert --$\hat{x}_j$--;

Signed and Sealed this

Sixteenth Day of October, 1990

*Attest:*

HARRY F. MANBECK, JR.

*Attesting Officer*  *Commissioner of Patents and Trademarks*